US010724390B2

(12) United States Patent
King et al.

(10) Patent No.: US 10,724,390 B2
(45) Date of Patent: Jul. 28, 2020

(54) COLLAR SUPPORT ASSEMBLY FOR AIRFOILS

(71) Applicant: General Electric Company, Schenectady, NY (US)

(72) Inventors: Daniel Elmer King, Norwood, OH (US); Curt Brian Curtis, Nesbit, MS (US); Ernest R. Broughton, Hernando, MS (US); George Han, Asheville, NC (US); Jeffrey Lawrence Sulikowski, Butler, KY (US)

(73) Assignee: General Electric Company, Schenectady, NY (US)

( * ) Notice: Subject to any disclaimer, the term of this patent is extended or adjusted under 35 U.S.C. 154(b) by 312 days.

(21) Appl. No.: 15/923,022

(22) Filed: Mar. 16, 2018

(65) Prior Publication Data

US 2019/0284945 A1 Sep. 19, 2019

(51) Int. Cl.
*F01D 9/04* (2006.01)

(52) U.S. Cl.
CPC ............ *F01D 9/042* (2013.01); *F01D 9/041* (2013.01); *F05D 2220/32* (2013.01); *F05D 2230/60* (2013.01); *F05D 2240/12* (2013.01); *F05D 2250/711* (2013.01); *F05D 2300/501* (2013.01)

(58) Field of Classification Search
CPC ........ F01D 9/042; F01D 9/041; F04D 29/522; F04D 29/542; F04D 29/646; F05D 2240/12
See application file for complete search history.

(56) References Cited

U.S. PATENT DOCUMENTS

| | | |
|---|---|---|
| 2,337,619 A | 12/1943 | Miller |
| 2,610,823 A | 9/1952 | Knowlton, Jr. |
| 2,686,656 A | 8/1954 | Abild |
| 2,914,300 A | 11/1959 | Sayre |
| 3,249,378 A | 5/1966 | Sees et al. |
| 3,314,652 A | 4/1967 | Geberth, Jr. et al. |
| 4,256,435 A | 3/1981 | Eckel |
| 4,500,255 A | 2/1985 | Webb |
| 4,827,588 A | 5/1989 | Meyer |

(Continued)

FOREIGN PATENT DOCUMENTS

| | | |
|---|---|---|
| EP | 0513958 A2 | 1/1992 |
| EP | 0654586 A1 | 11/1994 |

(Continued)

*Primary Examiner* — Eldon T Brockman
(74) *Attorney, Agent, or Firm* — Dority & Manning, P.A.

(57) ABSTRACT

Collar support assemblies are provided. For example, a collar support assembly for an airfoil comprises a collar that includes a first surface shaped complementary to a fillet of the airfoil and a planar second surface. The first surface is disposed adjacent the fillet of the airfoil. The collar support assembly further comprises a shim material disposed between the second surface and an airfoil support structure and a filler material inserted between the first surface and the fillet of the airfoil to provide a tight fit between the collar and the airfoil. In other embodiments, the collar support assembly comprises a pair of collars and supports an airfoil doublet. The airfoil doublets may be part of an outlet guide vane assembly of a gas turbine engine, and methods for assembling outlet guide vane assemblies also are provided.

20 Claims, 7 Drawing Sheets

(56) References Cited

U.S. PATENT DOCUMENTS

| | | |
|---|---|---|
| 4,832,568 A | 5/1989 | Roth et al. |
| 5,007,800 A | 4/1991 | Hacault et al. |
| 5,074,752 A * | 12/1991 | Murphy .................. F01D 9/042 |
| | | 415/119 |
| 5,222,360 A | 6/1993 | Antuna et al. |
| 5,226,789 A | 7/1993 | Donges |
| 5,272,869 A | 12/1993 | Dawson et al. |
| 5,320,490 A | 6/1994 | Corbin et al. |
| 5,399,069 A | 3/1995 | Marcy et al. |
| 5,522,705 A | 6/1996 | Elaini et al. |
| 5,740,674 A | 4/1998 | Beutin et al. |
| 5,765,993 A | 6/1998 | Weiss |
| 6,592,326 B2 | 7/2003 | Marx et al. |
| 6,619,917 B2 * | 9/2003 | Glover .................... F01D 9/042 |
| | | 29/889.22 |
| 6,821,087 B2 | 11/2004 | Matsumoto et al. |
| 7,172,389 B2 | 2/2007 | Hagle et al. |
| 7,300,253 B2 | 11/2007 | Beeck et al. |
| 7,371,046 B2 | 5/2008 | Lee et al. |
| 7,510,372 B2 | 3/2009 | Bogue et al. |
| 7,527,757 B2 | 5/2009 | Chevin et al. |
| 7,722,321 B2 | 5/2010 | Lhoest et al. |
| 7,837,435 B2 | 11/2010 | Ellis et al. |
| 7,931,442 B1 | 4/2011 | Liang |
| 7,980,817 B2 | 7/2011 | Foose et al. |
| 8,079,773 B2 | 12/2011 | Blanton |
| 8,459,942 B2 | 6/2013 | Sjunnesson et al. |
| 8,550,776 B2 | 10/2013 | McDonald et al. |
| 8,616,853 B2 * | 12/2013 | Belmonte ............... B29B 11/16 |
| | | 29/889.21 |
| 8,672,623 B2 | 3/2014 | Harper |
| 8,715,809 B2 | 5/2014 | Ravey |
| 8,733,156 B2 | 5/2014 | Stilin et al. |
| 8,734,101 B2 | 5/2014 | McDonald et al. |
| 8,740,556 B2 | 6/2014 | Papin et al. |
| 8,794,908 B2 | 8/2014 | Dezouche et al. |
| 8,998,574 B2 | 4/2015 | Menheere et al. |
| 9,303,520 B2 | 4/2016 | Hasting et al. |
| 9,303,531 B2 | 4/2016 | Hasting et al. |
| 2002/0076320 A1 * | 6/2002 | Glover .................... F01D 9/042 |
| | | 415/119 |
| 2007/0248780 A1 | 10/2007 | Schober et al. |
| 2008/0226458 A1 | 9/2008 | Pierrot et al. |
| 2009/0014926 A1 | 1/2009 | Marini |
| 2009/0238863 A1 | 9/2009 | Kojima et al. |
| 2010/0284815 A1 | 11/2010 | Parker et al. |
| 2011/0110787 A1 * | 5/2011 | Belmonte ............... B29B 11/16 |
| | | 416/223 R |
| 2012/0027604 A1 | 2/2012 | McDonald et al. |
| 2012/0051923 A1 | 3/2012 | McDonald et al. |
| 2012/0213633 A1 | 8/2012 | Samuelsson et al. |
| 2012/0244003 A1 | 9/2012 | Mason |
| 2012/0301312 A1 | 11/2012 | Berczik et al. |
| 2013/0052004 A1 | 2/2013 | Stilin |
| 2013/0149130 A1 | 6/2013 | Hasting et al. |
| 2014/0044550 A1 | 2/2014 | Kern et al. |
| 2014/0133975 A1 | 5/2014 | Hasting et al. |
| 2014/0140832 A1 | 5/2014 | Hasting et al. |
| 2016/0024971 A1 * | 1/2016 | Pearce .................... F01D 9/041 |
| | | 415/208.1 |
| 2016/0258305 A1 | 9/2016 | Wilber |
| 2017/0030223 A1 | 2/2017 | Parry et al. |

FOREIGN PATENT DOCUMENTS

| | | |
|---|---|---|
| EP | 1760266 A2 | 8/2006 |
| EP | 1975373 A1 | 3/2007 |
| EP | 1972757 A1 | 3/2008 |
| EP | 2233697 A2 | 3/2010 |
| EP | 2562361 A1 | 8/2012 |
| WO | WO 91/15357 | 10/1991 |

* cited by examiner

COLLAR SUPPORT ASSEMBLY FOR AIRFOILS

FIELD

The present subject matter relates generally to gas turbine engines and, more particularly, to a collar support assembly for airfoils of a stator airfoil assembly, such as an outlet guide vane assembly.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

The fan typically includes a stator airfoil assembly known as an outlet guide vane (OGV) assembly. The OGV assembly comprises a plurality of outlet guide vanes, or stator airfoils, that extend between an inner hub and an outer casing. One or more brackets may be provided on an outer surface of the outer casing, e.g., for ground handling of the OGV assembly during manufacturing and assembly of the gas turbine engine. Loads applied at the brackets, as well as other radial loads applied to the OGV assembly, can increase stresses at the outer fillets of the airfoils, particularly in composite airfoils, which usually have relatively large curved regions constituting the outer fillets.

Accordingly, improved airfoil support at the airfoil outer fillets would be welcomed in the technology. In particular, a collar support assembly that supports the airfoil outer fillets without increasing the weight, cost, and installation complexity of the stator airfoil assembly would be beneficial. More particularly, such collar support assemblies that provide increased support for the airfoils to handle compressive or bending loads would be advantageous.

BRIEF DESCRIPTION

Aspects and advantages of the invention will be set forth in part in the following description, or may be obvious from the description, or may be learned through practice of the invention.

In one exemplary embodiment of the present subject matter, a collar support assembly for an airfoil is provided. The collar support assembly comprises a collar that includes a first surface shaped complementary to a fillet of the airfoil and a planar second surface. The first surface is disposed adjacent the fillet of the airfoil. The collar support assembly further comprises a shim material disposed between the second surface and an airfoil support structure. The collar support assembly also comprises a filler material inserted between the first surface and the fillet of the airfoil to provide a tight fit between the collar and the airfoil.

In another exemplary embodiment of the present subject matter, a collar support assembly for an airfoil doublet is provided. A first airfoil of the airfoil doublet has a first fillet along an outer edge of the first airfoil, and a second airfoil of the airfoil doublet has a second fillet along an outer edge of the second airfoil. The collar support assembly comprises a pair of collars, a shim material, and a filler material. A first collar of the pair of collars has a first surface shaped complementary to the first fillet and a planar second surface. A second collar of the pair of collars has a first surface shaped complementary to the second fillet and a planar second surface. The first surface of the first collar is disposed adjacent the first fillet, and the first surface of the second collar is disposed adjacent the second fillet. The shim material is disposed between the second surface of each collar and an airfoil support structure. The filler material is inserted between the first surface of each collar and the respective fillet to provide a tight fit between the collar and the respective airfoil.

In a further exemplary embodiment of the present subject matter, a method for assembling an outlet guide vane assembly of a gas turbine engine is provided. The method comprises applying a filler material to a first surface of a first collar; positioning the first surface of the first collar adjacent a first fillet defined along an outer surface of a first airfoil of an airfoil doublet; and securing the first collar to a casing of the outlet guide vane assembly. The first surface of the first collar is shaped complementary to the first fillet of the first airfoil.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows. Further, with respect to engine embodiments described herein, the terms "fore" or "forward" and "aft" generally refer to a position in relation to an ambient air inlet and an exhaust nozzle of the engine.

The exemplary apparatus and methods described herein overcome at least some disadvantages of known stator airfoil assemblies for use in a gas turbine engine. Moreover, the collar support assemblies and assembly methods described herein enable support of one or more airfoils of a stator airfoil assembly, particularly with respect to the application of compressive loads to the airfoils. More specifically, the collar support assembly for an airfoil described herein comprises a collar including a first surface shaped complementary to a fillet of the airfoil and a planar second surface. The first surface is disposed adjacent the fillet of the airfoil. A shim material is disposed between the second surface and an airfoil support structure, and a filler material inserted between the first surface and the fillet of the airfoil to provide a tight fit between the collar and the airfoil.

Advantages of the systems and methods described herein include a reduction of stresses within the outer fillet of a stator airfoil, such as an outlet guide vane. The systems and methods described herein provide a structural collar support to the outer fillets to meet structural requirements of the airfoils. In embodiments in which the airfoils are formed from a composite material, the collar supports may be formed from a metallic material to avoid the cost and technological development effort to provide a composite support solution for the outer fillet stresses. Additionally, the systems and methods described herein provide a relatively low-weight solution, which, for turbofan jet engine applications, can reduce overall engine weight that, in turn, translates into increased fuel range for an aircraft in which the engine is installed.

Figure 1:
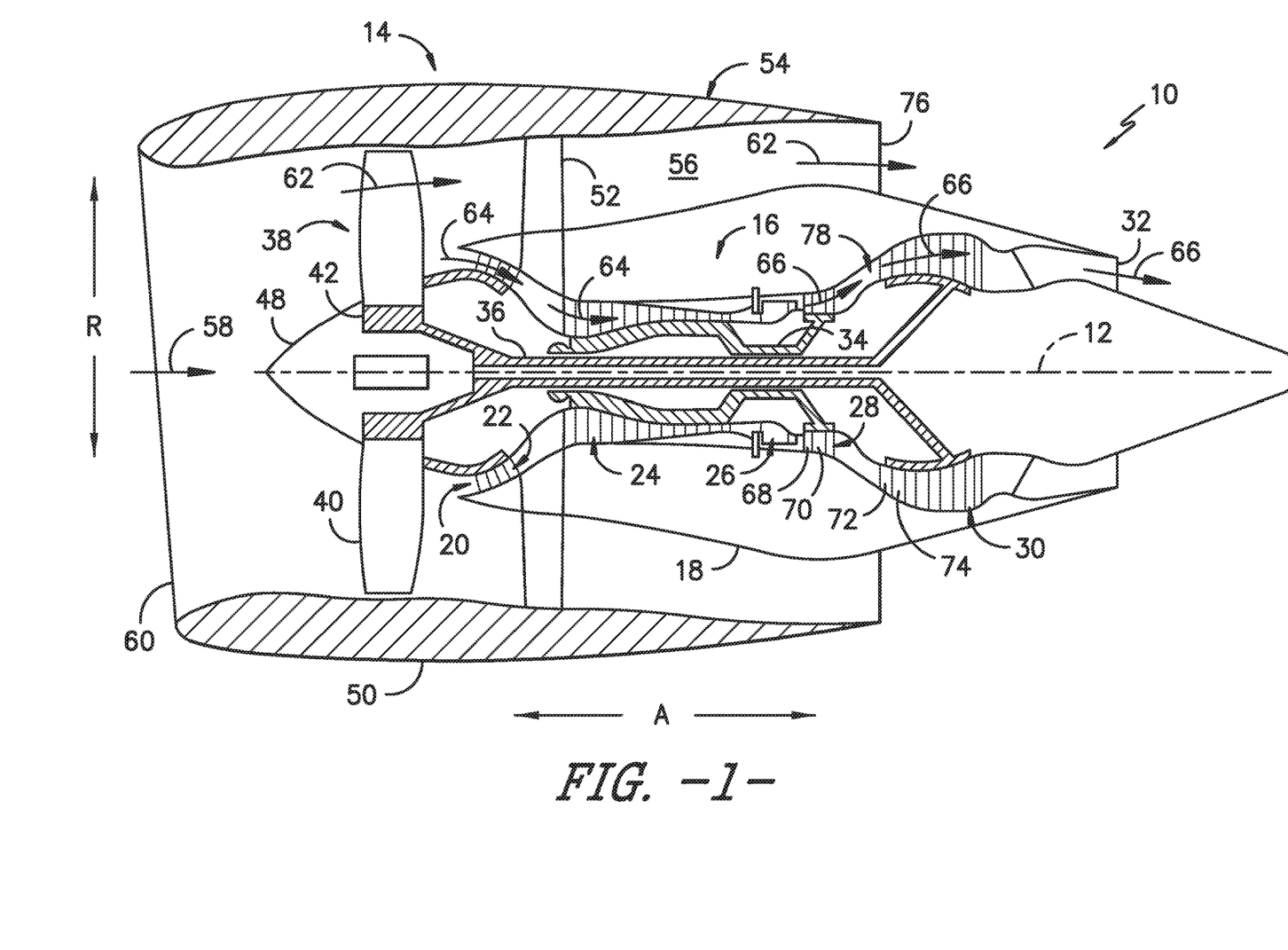
FIG. 1 provides a schematic cross-section view of an exemplary gas turbine engine, according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbofan engine 10, additional spools may be provided such that engine 10 may be described as a multi-spool engine.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

Figure 2:
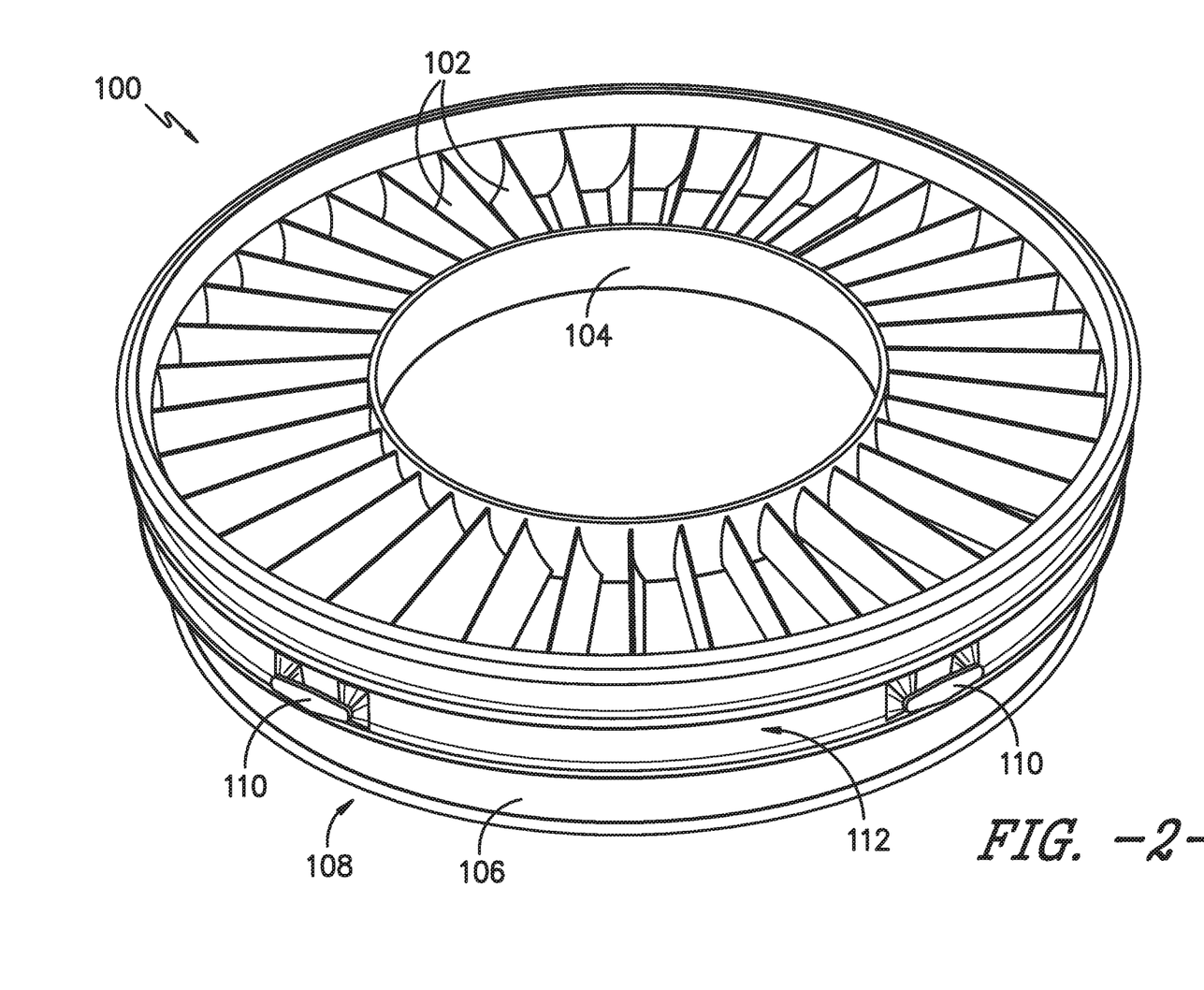
FIG. 2 provides a perspective view of a stator airfoil assembly according to an exemplary embodiment of the present subject matter.

FIG. 2 provides a perspective view of a stator airfoil assembly 100 according to an exemplary embodiment of the present subject matter. As shown, the stator airfoil assembly 100 is generally annular in shape, with a plurality of airfoils 102 extending from an inner wall 104 to an outer wall 106. The inner and outer walls 104, 106 form an airfoil support structure 108. In the illustrated embodiment, the stator airfoil assembly 100 is an outlet guide vane (OGV) assembly, such that the airfoils 102 are outlet guide vanes (OGVs) and the outer wall 106 of the airfoil support structure 108 is a fan case, such as fan casing 50 shown in FIG. 1. When installed within a gas turbine engine, such as turbofan engine 10, the OGV assembly 100 extends circumferentially about the axial centerline 12. Accordingly, each airfoil or OGV 102 extends along the radial direction R from the inner wall 104 to the outer wall 106.

Figure 3:
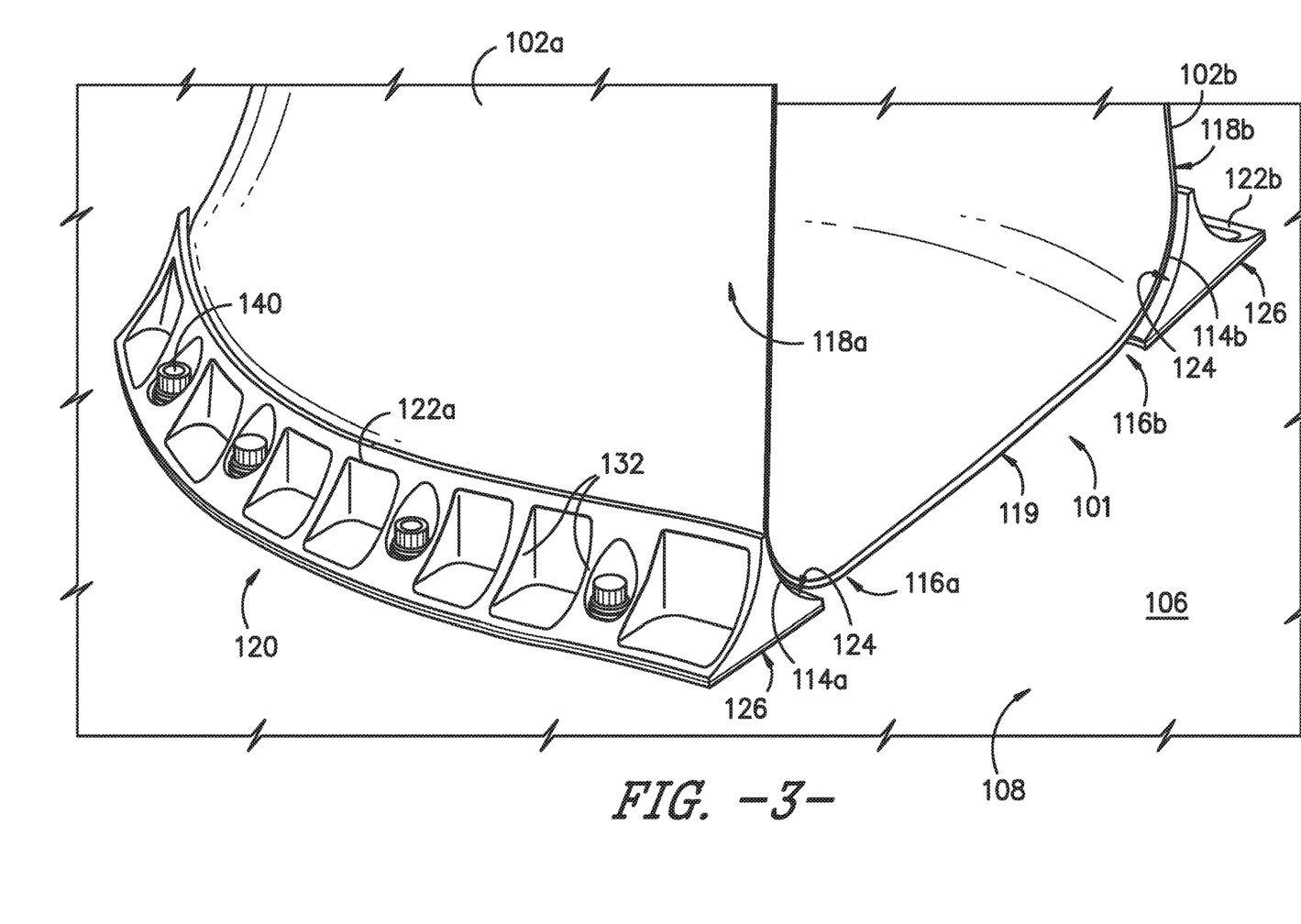
FIG. 3 provides a perspective view of a collar support assembly secured to an outer wall of the stator airfoil assembly adjacent an outer portion of an airfoil doublet of the stator airfoil assembly of FIG. 2.

Referring to FIG. 3, the plurality of airfoils 102 of the stator airfoil assembly 100 may be constructed as airfoil doublets 101, each airfoil doublet 101 having a first airfoil 102a and a second airfoil 102b. In particular embodiments, the airfoil doublets 101 are formed from a composite material, such as a polymer matrix composite (PMC) or a ceramic matrix composite (CMC). As shown in FIG. 3, the first airfoil 102a of the airfoil doublet 101 has a first fillet 114a along an outer edge 116a of the first airfoil 102a, and the second airfoil 102b of the airfoil doublet 101 has a second fillet 114b along an outer edge 116b of the second airfoil 102b. It will be appreciated that each fillet 114a, 114b generally is a transition portion along an outer surface 118 of the respective airfoil 102a, 102b, where the airfoil transitions from extending generally along the radial direction R to extending generally along the airfoil support structure 108, which extends tangential to the airfoils 102a, 102b. Thus, each fillet 114a, 114b curves under the respective airfoil 102a, 102b and toward the airfoil support structure 108 such that each fillet 114a, 114b is substantially convex in shape with respect to the outer surface 118 of its airfoil 102.

Referring back to FIG. 2, one or more brackets 110 may extend radially from the outer wall 106, i.e., from an outer surface 112 of the outer wall 106. The brackets 110 may be used for a variety of purposes, such as, e.g., ground handling of the stator airfoil assembly 100 during manufacturing and assembly of the engine 10. The application of loads at the brackets 110 along the outer surface 112 of the outer wall 106 may cause high radial loads on the airfoils 102, particularly at the airfoil fillets 114 between the airfoils 102 and the outer wall 106. As such, a collar support assembly 120 may be used at each fillet 114 to provide structural support to the airfoils 102.

An exemplary collar support assembly 120 is illustrated in FIGS. 3, 4, 5, and 6. As shown in the exemplary embodiment, the collar support assembly 120 includes a collar 122 having a first surface 124 shaped complementary to the airfoil fillet 114 adjacent which the collar 122 is disposed and a planar second surface 126. More particularly, the collar first surface 124 is disposed adjacent the outer surface 118 of the airfoil 102, and the collar second surface 126 is disposed adjacent the airfoil support structure 108. A shim material 128 may be disposed between the collar second surface 126 and the airfoil support structure 108 to help line up the collar 122 with the fillet 114 and provide a close fit between the collar 122 and the airfoil 102. The shim material 128 needed for a collar support assembly 120 may vary from airfoil 102 to airfoil 102, i.e., more, less, or no shim material 128 may be needed for a collar support assembly 120 installed at one airfoil 102 compared to a collar support assembly 120 installed at another airfoil 102. Further, a filler material 130 (FIG. 6) may be inserted between the first surface 124 and the airfoil fillet 114 to provide a tight fit between the collar 122 and the airfoil 102. In exemplary embodiments, the filler material 130 is an epoxy, resin, or the like that has a modulus of elasticity within a range of about 0.05 MSI to about 3 MSI. In particular embodiments, the filler material 130 has a modulus of elasticity within the range of about 0.1 MSI to about 2 MSI. Like the shim material 128, the amount of filler material 130 needed may vary from one collar support assembly 120 to another. For example, after the filler material 130 is inserted between the collar 122 and the airfoil 102, the collar 122 may be pressed toward the airfoil 102 to squeeze out any excess filler material 130.

Figure 6:
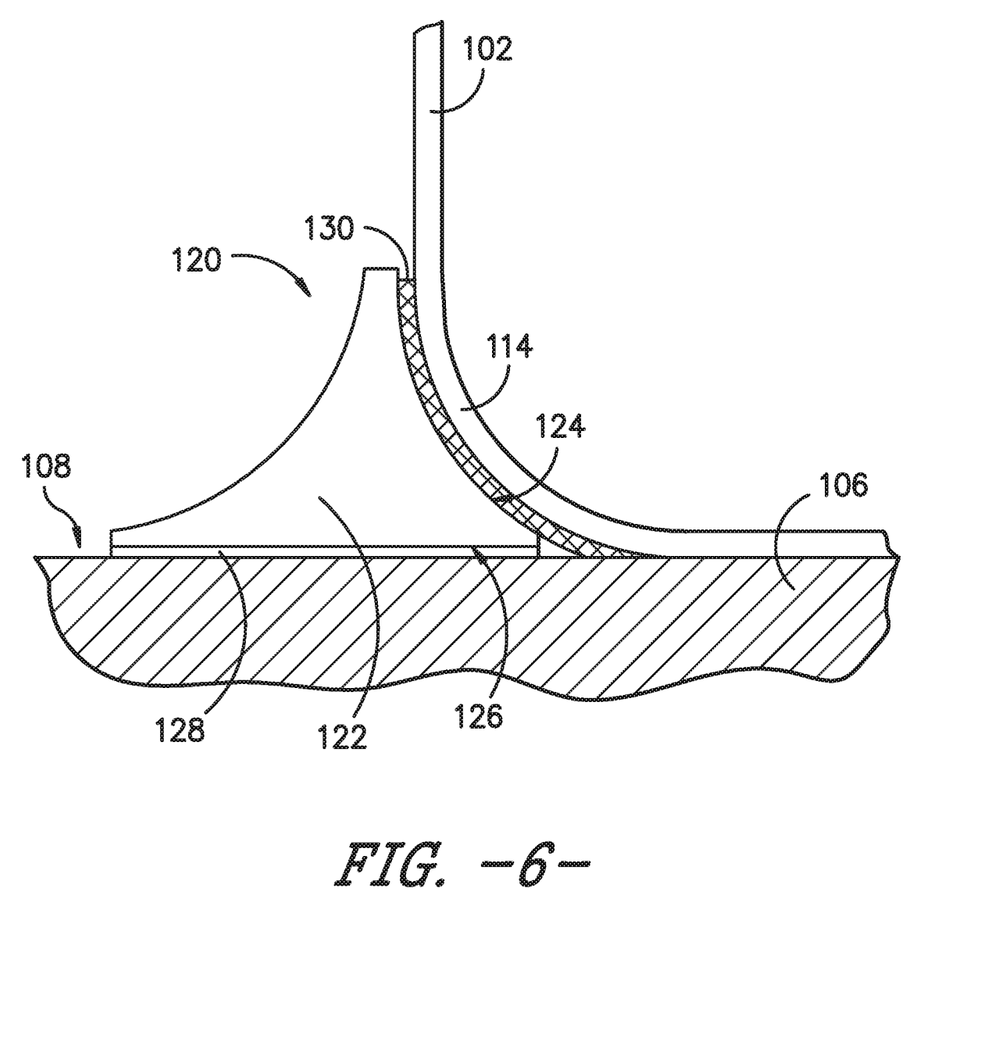
FIG. 6 provides an end view of the portion of the outer wall of the stator airfoil assembly, the collar support assembly, and the outer portion of the airfoil doublet of FIGS. 3 and 4.

As illustrated in the figures, and as best shown in FIG. 6, the first surface 124 of the collar 122 is generally concave in shape. As discussed above, each fillet 114 is generally convex in shape. Accordingly, the first surface 124 of the collar 122 is complementary in shape to the fillet 114 against which the collar 122 is placed. As such, the collar 122 forms a wedge supporting the airfoil 102 at the fillet 114. Moreover, a plurality of ribs 132 extends from the first surface 124 to the second surface 126 of the collar 122. The ribs 132 stiffen the collar 122 such that the collar 122 can support the airfoil 102. It will be appreciated that the number and configuration of the ribs 132 may be optimized to provide an acceptable stiffness to the collar 122 while minimizing the weight of the collar 122 (e.g., by removing as much material as possible between the first surface 124 and second surface 126 without compromising the needed stiffness of the collar 122) and providing a relatively simple collar shape to simplify manufacturing (e.g., by delineating a tool cut path that allows for relatively easy and/or fast machining of the collar 122). Further, the collars 122 may be formed from a metallic material, such as aluminum or the like, to simplify manufacturing, e.g., compared to using a composite structure to support the airfoils 102.

Figure 4:
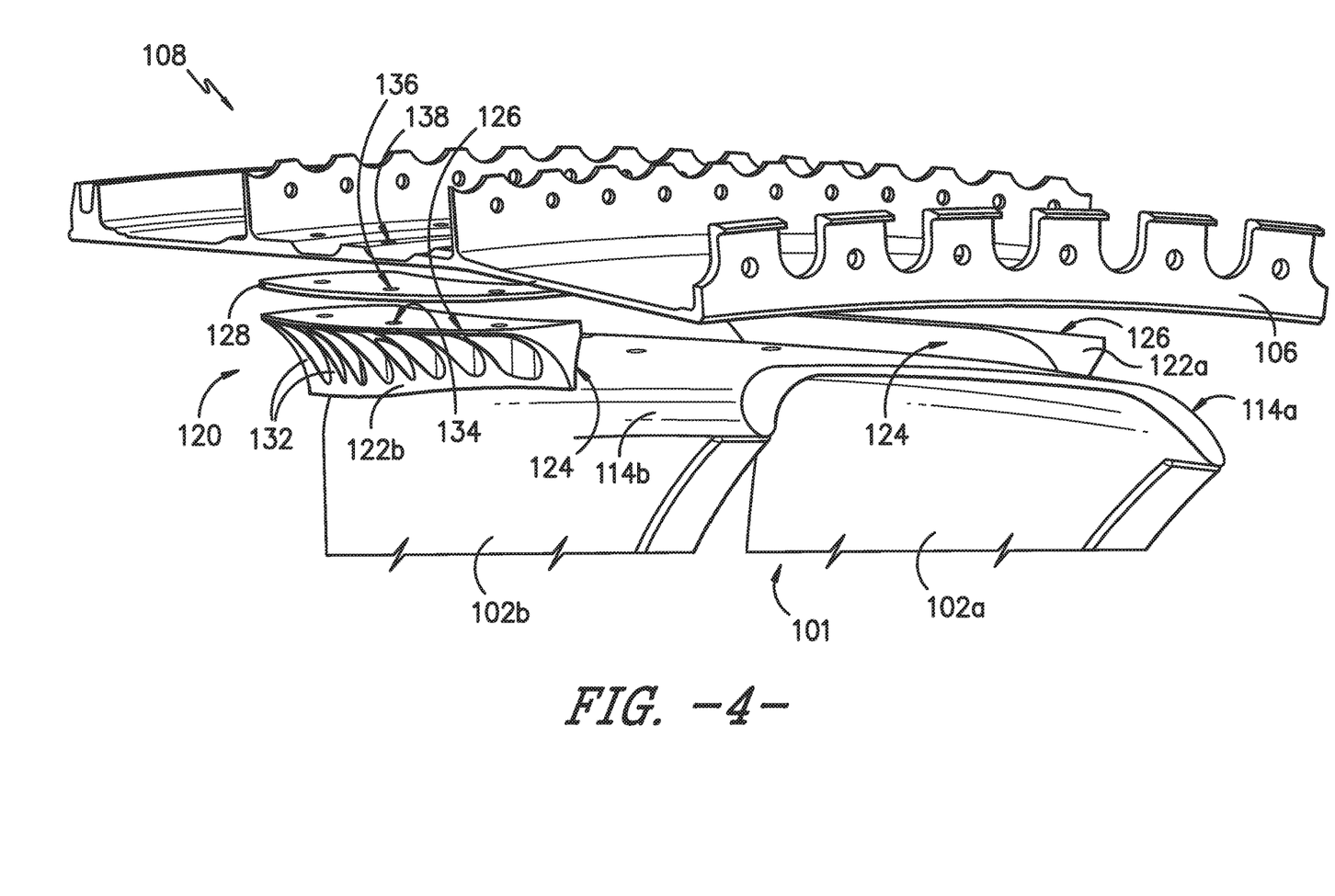
FIG. 4 provides an exploded view of a portion of the outer wall of the stator airfoil assembly, the collar support assembly, and the outer portion of the airfoil doublet of FIG. 3.

Additionally, in the exemplary embodiment, at least one aperture 134 is defined through the second surface 126 of the collar 122 for securing the collar 122 to the airfoil support structure 108. More particularly, as illustrated in FIG. 4, a plurality of apertures 134 is defined through the collar 122, a plurality of apertures 136 is defined through the shim material 128, and a plurality of apertures 138 is defined through the airfoil support structure 108. Each of the collar apertures 134 aligns with a shim aperture 136, which in turn aligns with an airfoil support structure aperture 138. As depicted in FIG. 3, a fastener 140 may be received through the aligned apertures 134, 136, 138 to fasten the collar 122 and shim material 128 to the airfoil support structure 108 and thereby secure the collar 122 in place with respect to the airfoil 102 and the airfoil support structure 108. The fasteners 140 may be any suitable fasteners, such as screws, bolts, or the like, for securing the collar 122 and shim material 128 to the airfoil support structure 108.

As previously described, in an exemplary embodiment, the stator airfoil assembly 100 is an OGV assembly comprising a plurality of airfoil doublets 101, each doublet 101 having a first airfoil 102a and a second airfoil 102b. Each airfoil 102a, 102b of a doublet 101 has a fillet 114 defined along an outer surface 119 of the doublet 101. More particularly, the first airfoil 102a of the doublet 101 has a first fillet 114a along the outer surface 118a of the airfoil 102a, and the second airfoil 102b of the doublet 101 has a second fillet 114b along the outer surface 118b of the airfoil 102b, where the fillets 114a, 114b are defined along the respective outer surfaces 118a, 118b on the outer surface 119 of the doublet 101. The airfoils 102a, 102b are OGVs, such that the airfoil doublet 101 is an outlet guide vane doublet. Further, in such embodiments, the outer wall 106 of the airfoil support structure 108 is a fan case, e.g., fan casing 50, and the plurality of doublets 101 are secured to the fan case and the inner wall or hub 104 to form the OGV assembly 100.

Figure 5:
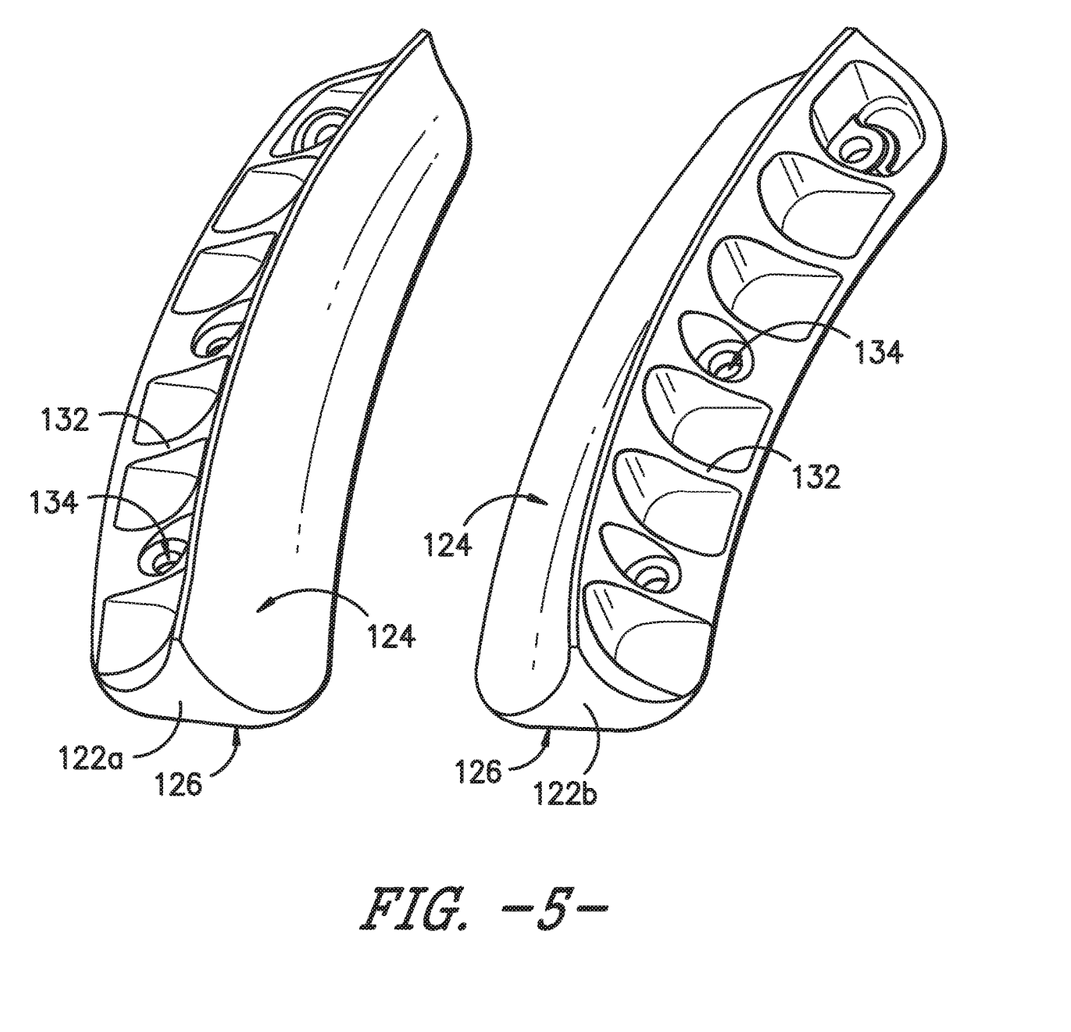
FIG. 5 provides a perspective view of a first collar and a second collar of the collar support assembly of FIGS. 3 and 4.

Referring to FIGS. 3, 4, and 5, the collar support assembly 120 for a doublet 101 includes a pair of collars 122, i.e., a first collar 122a for supporting the first airfoil 102a of the doublet 101 and a second collar 122b for supporting the second airfoil 102b of the doublet 101. The collars 122a, 122b of the collar support assembly 120 are configured as previously described, e.g., each collar 122a, 122b has a planar second surface 126 with a plurality of ribs 130 extending between the first and second surfaces 124, 126. As shown most clearly in FIG. 3, the first surface 124 of the first collar 122a is shaped complementary to the first fillet 114a and the first surface 124 of the second collar 122b is shaped complementary to the second fillet 114b. Accordingly, the first surface 124 of the first collar 122a is concave in shape to complement the convex shape of the first fillet 114a, and the first surface 124 of the second collar 122b is concave in shape to complement the convex shape of the second fillet 114b. Thus, when the first surface 124 of the first collar 122a is disposed adjacent the first fillet 114a of the first airfoil 102a, i.e., adjacent the outer surface 119 of the doublet 101, the first collar 122a forms a wedge that supports the first airfoil 102a. Likewise, when the first surface 124 of the second collar 122b is disposed adjacent the second fillet 114b of the second airfoil 102b, i.e., adjacent the outer surface 119 of the doublet 101, the second collar 122b forms a wedge supporting the second airfoil 102b.

As described above, a shim material 128 may be disposed between the second surface 126 of each collar 122a, 122b and the airfoil support structure 108 of the stator airfoil assembly 100 comprising the doublets 101. Further, a filler material 130 may be inserted between the first surface 124 of each collar 122a, 122b and the respective fillet 114a, 114b to provide a tight fit between the collar 122a, 122b and the respective airfoil 102a, 102b. In some embodiments, the filler material 130 inserted between the first surface 124 of the first collar 122a and the first fillet 114a has a modulus of elasticity within a range of about 0.05 MSI to about 3 MSI and, more particularly, within a range of about 0.1 MSI to about 2 MSI. Similarly, the filler material 130 inserted between the first surface 124 of the second collar 122b and the second fillet 114b has a modulus of elasticity within a range of about 0.05 MSI to about 3 MSI and, more particularly, within a range of about 0.1 MSI to about 2 MSI. Moreover, at least one aperture 134 is defined through each collar 122a, 122b, at least one aperture 136 is defined through the shim material 128 adjacent each collar 122a, 122b, and at least one aperture 138 is defined through the outer wall 106 of the airfoil support structure 108 adjacent each collar 122a, 122b. As previously described, for each of the first and second collars 122a, 122b, an aperture 134 aligns with an aperture 136, which aligns with an aperture 138, and a fastener 140 is inserted through the aligned apertures 134, 136, 138 to secure the collars 122a, 122b to the airfoil support structure or fan case 108.

It will be appreciated that a collar support assembly 120 need not be provided at each airfoil 102 of the stator airfoil assembly 100. Rather, a collar support assembly 120 may be provided at only those airfoils 102 or airfoil doublets 101 that experience relatively high radial loads, which loads the composite fibers of composite airfoils 102 in compression and tends to cause the airfoils 102 to bend, and also may cause inter-laminar stresses within the composite airfoils 102. For example, the airfoils 102 or airfoil doublets 101 adjacent brackets 110 may be supported with a collar support assembly 120 to reduce any bending induced through loads applied at the brackets 110. As such, any additional weight introduced to the gas turbine engine through the use of collar support assemblies 120 may be minimized, i.e., only the collar support assemblies 120 needed to reduce undesirable loads on the airfoils 102 are provided to minimize the additional weight of the collar support assemblies 120. Further, the collars 122 may be formed from a lightweight material, such as aluminum or the like, to further minimize the weight of the collar support assemblies 120.

Figure 7:
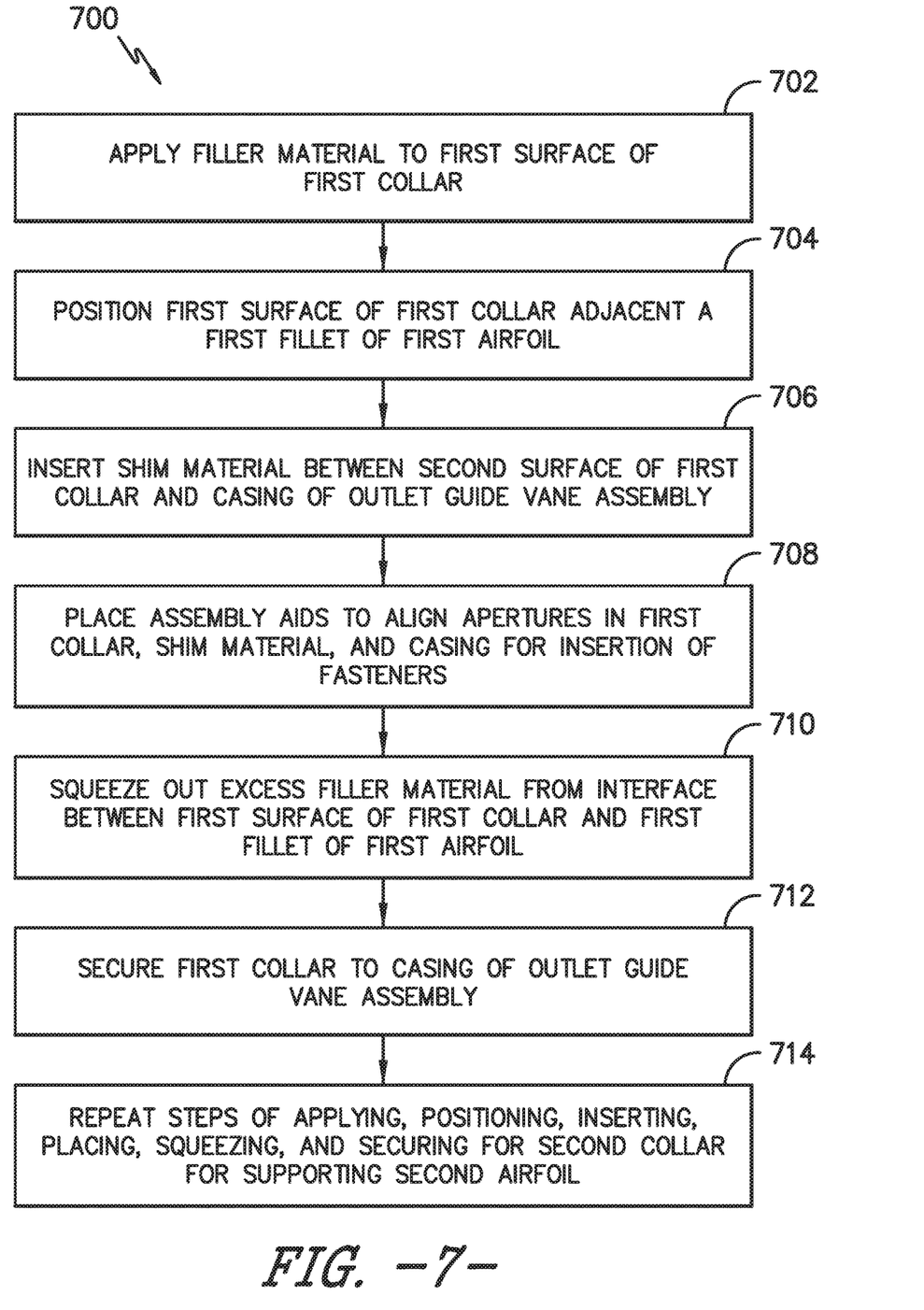
FIG. 7 provides a flow diagram of a method of assembling a collar support assembly according to an exemplary embodiment of the present subject matter.

The present subject matter also provides methods for assembling the stator airfoil or OGV assembly 100 having one or more collar support assemblies 120. Referring to FIG. 7, an assembly method 700 is provided according to an exemplary embodiment of the present subject matter. The exemplary assembly method 700 is directed to assembling a collar support assembly 120 with an airfoil doublet 101, such that the collar support assembly 120 includes first and second collars 122a, 122b. However, it will be appreciated that method 700 may easily be modified for the assembly of a collar support assembly 120 having a single collar 122 with an airfoil 102.

As shown at 702, the method 700 includes applying the filler material 130 to the first surface 124 of the first collar 122a of the collar support assembly 120. Next, as illustrated at 704, the first surface 124 of the first collar 122a is positioned adjacent the first fillet 114a of the first airfoil 102a of the airfoil doublet 101. As previously described, the first surface 124 of the first collar 122a is shaped complementary to the first fillet 114a to provide a close fit between the first collar 122a and the first airfoil 102a. As shown at 706, any needed shim material 128 is inserted between the second surface 126 of the first collar 122a and the airfoil support structure 108 (more particularly, the outer wall or fan casing 106 of the OGV assembly 100) to provide a tight fit between the first collar 122a and the first airfoil 102a. Then, as depicted at 708 in FIG. 7, assembly aids are placed about the first collar 122a to align the collar apertures 134 of the first collar 122a with the adjacent shim apertures 136 and airfoil support structure apertures 138 such that fasteners 140 may be inserted through the apertures 134, 136, 138 to secure the first collar 122a to the outer wall or casing 106 of the airfoil support structure 108. At 710, any excess filler material 130 is squeezed out of the interface between the first surface 124 of the first collar 122a and the first fillet 114a of the first airfoil 102a. Finally, as shown at 712, the first collar 122a is secured to the outer wall or casing 106 of the outlet guide vane assembly 100 using one or more fasteners 140.

As indicated at 714, steps 702 through 712 may be repeated with respect to the second collar 122b of the collar support assembly 120. More specifically, as shown at 702, filler material 130 is applied to the first surface 124 of the second collar 122b of the collar support assembly 120. Next, as illustrated at 704, the first surface 124 of the second collar 122b is positioned adjacent the second fillet 114b of the second airfoil 102b of the airfoil doublet 101. As previously described, the first surface 124 of the second collar 122b is shaped complementary to the second fillet 114b to provide a close fit between the second collar 122b and the second airfoil 102b. As shown at 706, any needed shim material 128 is inserted between the second surface 126 of the second collar 122b and the airfoil support structure 108 (more particularly, the outer wall or fan casing 106 of the OGV assembly 100) to provide a tight fit between the second collar 122b and the second airfoil 102b. Then, as depicted at 708 in FIG. 7, assembly aids are placed about the second collar 122b to align the collar apertures 134 of the second collar 122b with the adjacent shim apertures 136 and airfoil support structure apertures 138 such that fasteners 140 may be inserted through the apertures 134, 136, 138 to secure the second collar 122b to the outer wall or casing 106 of the airfoil support structure 108. At 710, any excess filler material 130 is squeezed out of the interface between the first surface 124 of the second collar 122b and the second fillet 114b of the second airfoil 102b. Finally, as shown at 712, the second collar 122b is secured to the outer wall or casing 106 of the outlet guide vane assembly 100 using one or more fasteners 140. Further, the method 700 may be repeated for each collar support assembly 120 installed with the stator airfoil or OGV assembly 100.

As described herein, the collar support assembly 120 and assembly method 700 help enable a reduction of stresses within the outer fillet of a stator airfoil, such as an outlet guide vane. The collar support assembly 120 provides a structural collar support to the airfoil outer fillets 114 to meet structural requirements of the airfoils 102. The collar support assembly 120 may be formed from a metallic material in a manner that optimizes stiffness versus weight of the assembly, e.g., to reduce manufacturing cost and complexity, as well as minimize the weight of the stator airfoil or OGV assembly 100. Of course, other advantages of the present subject matter also may occur to those of ordinary skill in the art.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A collar support assembly for an airfoil, comprising:
a collar including a first surface shaped complementary to a fillet of the airfoil and a planar second surface, the first surface disposed adjacent the fillet of the airfoil;
a shim material disposed between the second surface and an airfoil support structure; and
a filler material inserted between the first surface and the fillet of the airfoil to provide a tight fit between the collar and the airfoil.

2. The collar support assembly of claim 1, wherein a plurality of ribs extends from the first surface to the second surface of the collar.

3. The collar support assembly of claim 1, wherein the filler material has a modulus of elasticity within a range of about 0.1 MSI to about 2 MSI.

4. The collar support assembly of claim 1, wherein the fillet is convex in shape such that the collar forms a wedge supporting the airfoil at the fillet.

5. The collar support assembly of claim 1, wherein an aperture is defined through the second surface of the collar for securing the collar to the airfoil support structure.

6. The collar support assembly of claim 1, wherein the airfoil is one airfoil of an airfoil doublet and the fillet extends along an outer surface of the airfoil doublet such that the first surface of the collar is disposed adjacent the outer surface of the airfoil doublet.

7. The collar support assembly of claim 1, wherein the airfoil support structure comprises an inner wall and an outer wall, wherein the outer wall is a fan case, and wherein the airfoil is an outlet guide vane.

8. A collar support assembly for an airfoil doublet, a first airfoil of the airfoil doublet having a first fillet along an outer edge of the first airfoil, a second airfoil of the airfoil doublet having a second fillet along an outer edge of the second airfoil, the collar support assembly comprising:
a pair of collars, a first collar of the pair of collars having a first surface shaped complementary to the first fillet and a planar second surface, a second collar of the pair of collars having a first surface shaped complementary to the second fillet and a planar second surface, the first surface of the first collar disposed adjacent the first fillet, the first surface of the second collar disposed adjacent the second fillet;
a shim material disposed between the second surface of each collar and an airfoil support structure; and
a filler material inserted between the first surface of each collar and the respective fillet to provide a tight fit between the collar and the respective airfoil.

9. The collar support assembly of claim 8, wherein a plurality of ribs extends from the first surface to the second surface of the first collar.

10. The collar support assembly of claim 8, wherein a plurality of ribs extends from the first surface to the second surface of the second collar.

11. The collar support assembly of claim 8, wherein the filler material inserted between the first surface of the first collar and the first fillet has a modulus of elasticity within a range of about 0.1 MSI to about 2 MSI.

12. The collar support assembly of claim 8, wherein the filler material inserted between the first surface of the second collar and the second fillet has a modulus of elasticity within a range of about 0.1 MSI to about 2 MSI.

13. The collar support assembly of claim 8, wherein the first fillet is convex in shape such that the first collar forms a wedge supporting the first airfoil at the first fillet, and wherein the second fillet is convex in shape such that the second collar forms a wedge supporting the second airfoil at the second fillet.

14. The collar support assembly of claim 8, wherein an aperture is defined through the second surface of each collar for securing the respective collar to the airfoil support structure.

15. The collar support assembly of claim 8, wherein the airfoil support structure comprises an inner wall and an outer wall, wherein the outer wall is a fan case, and wherein the airfoil doublet is an outlet guide vane doublet.

16. A method for assembling an outlet guide vane assembly of a gas turbine engine, the method comprising:
   applying a filler material to a first surface of a first collar;
   positioning the first surface of the first collar adjacent a first fillet defined along an outer surface of a first airfoil of an airfoil doublet, the first surface of the first collar shaped complementary to the first fillet of the first airfoil; and
   securing the first collar to a casing of the outlet guide vane assembly.

17. The method of claim 16, further comprising:
   inserting a shim material between a second surface of the first collar and the casing, wherein the second surface is planar.

18. The method of claim 16, further comprising:
   squeezing out excess filler material from an interface between the first surface of the first collar and the first fillet.

19. The method of claim 16, further comprising:
   placing assembly aids to line up apertures in the first collar and the casing for the insertion of fasteners within the apertures to secure the first collar to the casing.

20. The method of claim 16, further comprising:
   applying a filler material to a first surface of a second collar;
   positioning the first surface of the second collar adjacent a second fillet defined along an outer surface of a second airfoil of the airfoil doublet, the first surface of the second collar shaped complementary to the second fillet of the second airfoil; and
   securing the second collar to a casing of the outlet guide vane assembly.

* * * * *